United States Patent [19]

Cunningham

[11] 4,035,037

[45] July 12, 1977

[54] HYDROSTATIC BEARING SUPPORT

[75] Inventor: Robert E. Cunningham, Fairview Park, Ohio

[73] Assignee: The United States of America as represented by the Administrator of the National Aeronautics and Space Administration, Washington, D.C.

[21] Appl. No.: 663,008

[22] Filed: Mar. 2, 1976

[51] Int. Cl.² .......................................... F16C 1/24
[52] U.S. Cl. ................................... 308/5 R; 308/9; 308/73
[58] Field of Search ................... 308/5 R, 9, 72, 73

[56] References Cited

U.S. PATENT DOCUMENTS

| 3,442,560 | 5/1969 | De Gast | 308/5 R |
| 3,476,447 | 11/1969 | Boyd | 308/9 |
| B 391,797 | 3/1976 | Okano | 308/9 |

Primary Examiner—Joseph F. Peters, Jr.
Assistant Examiner—Gene A. Church
Attorney, Agent, or Firm—N. T. Musial; G. E. Shook; John R. Manning

[57] ABSTRACT

A hydrostatic bearing support system is provided which comprises a bearing housing having a polygonally configured outer surface which defines at least three symmetrically disposed working faces and a plurality of pressure plates, each of which is disposed relatively opposite a corresponding working face and spaced therefrom to define a gap therebetween. A hydrostatic support film is created in the gap for supporting the housing in spaced relationship to the pressure plates.

5 Claims, 2 Drawing Figures

(54) HYDROSTATIC BEARING SUPPORT

ORIGIN OF THE INVENTION

The invention described herein was made by an employee of the United States Government and may be manufactured or used by or for the Government without the payment of any royalties thereon or therefor.

FIELD OF THE INVENTION

The present invention relates in general to bearing support systems, and in particular to hydrostatic support systems for rotor bearings in high speed turbomachines.

BACKGROUND OF THE INVENTION

It is common, particularly in the small, lightweight, high speed turbomachines which are increasingly being used in a variety of applications, to encounter one or more system resonances in accelerating the rotating components to design speed. If conventional rigid bearing supports are used, the rotating components must be carefully balanced in order for the machinery to pass through the critical speeds with minimum excursion of the rotating members. However, with high operating speeds of many turbomachines, which speeds may be in the range of 36,000 rpm, even relatively small imbalances in rotating components will produce excessive vibration.

Much attention has been devoted to developing so-called "flexible" or "soft" bearing supports, i.e., supports which have a stiffness much less than that of the bearings. Further, since an undamped flexible support system is highly sensitive to external shocks, various damping mechanisms have also been developed.

In order to overcome the disadvantage associated with conventional flexible supports such as rubber O-rings, springs, diaphragms, and the like, and with conventional damping methods such as the use of lubricating oils and elastomers (see, e.g., the U.S. Pat. No. 3,097,167, to Beyerle), hydrostatic bearing systems have been developed. Although this listing is not, nor is it intended to be, exhaustive, such hydrostatic bearings are illustrated in U.S. Pat. Nos. 3,049,383 (Loch); 3,442,560 (de Gast); and 3,499,691 (Baier). These and other conventional hydrostatic bearing systems are characterized by their circular geometries. As a consequence, some means, such as anti-rotation pins, or the like, are required to prevent relative rotation between the bearings and the bearing supports. Moreover, a circular geometry makes it very difficult to vary the dynamic damping characteristic of the hydrostatic supporting film, or to selectively adjust the dynamic stiffness characteristic of portions or particular areas of the supporting film. Conventional hydrostatic bearing systems thus have limited effectiveness in controlling the various rotor unbalance forces generated at different rotor speeds.

SUMMARY OF THE INVENTION

These and other disadvantages of the prior art are overcome by a hydrostatic support system constructed according to the present invention. The system of the present invention comprises a bearing housing in which the bearings are disposed, and a plurality of associated pressure plates. The bearing housing has a substantially polygonal outer surface configuration as viewed in transverse cross-section perpendicular to the axis of rotation of the rotating member being supported, and the outer surface of the housing forms at least three symmetrically disposed working faces. A pressure plate is disposed relatively opposite each of the working faces of the housing and is spaced from the corresponding working face such that a gap is defined between each associated working face and pressure plate when the housing is centered with respect to the pressure plates. Means are also provided for introducing fluid under pressure into the gaps to form supporting hydrostatic films between the working faces and the pressure plates such that the housing may be suspended between the pressure plates in spaced relationship thereto.

Advantageously, at least one of the pressure plates is movable to provide adjustment of the thickness of the gaps and thereby to vary the damping characteristic of the supporting film. Additionally, or alternatively, the means for introducing fluid under pressure is controllable to adjust the pressure of the supporting film and thereby vary its stiffness. In addition, the gap-facing surface of each pressure plate preferably includes at least two recessed pockets may comprise rows of orifice restrictors.

In accordance with the invention, a hydrostatic bearing system is thus provided which enables one to readily adjust the thickness of the supporting hydrostatic films and hence to adjust the dynamic damping characteristics of the supporting films. In addition, the bearing system enables one selectively to vary the pressure and thus the stiffness of the film in a particular area of the bearing support. Further, the dynamic characteristics of the supporting film may be "tuned" without interrupting the operation of the rotating equipment, allowing adjustment of the bearing support system to varying operating conditions. As a result, both the threshold and amplitude of non-synchronous, self-excited, rotor precession and synchronous, externally exited rotor precession can be controlled. Further, the polygonal geometry eliminates the need for additional rotation-controlling structure.

Other features and advantages of the invention will be set forth in, or apparent from, the detailed description of a preferred embodiment found hereinbelow.

DETAILED DESCRIPTION OF THE PREFERRED EMBODIMENTS

Figure 1:
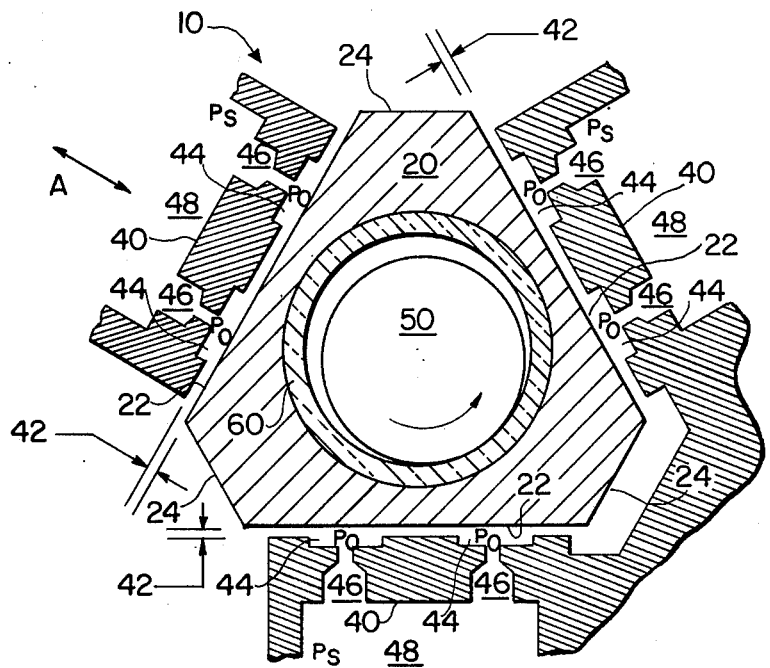
FIG. 1 is a simplified diagrammatic, transverse cross-sectional view of a first embodiment of the present invention taken perpendicular to the axis of rotation of the rotating member being supported.

Referring to FIG. 1, an embodiment of a hydrostatic bearing support system constructed according to the present invention is illustrated. The support system, generally denoted 10, basically comprises a bearing housing 20 and a plurality of pressure plates 40.

Figure 2:
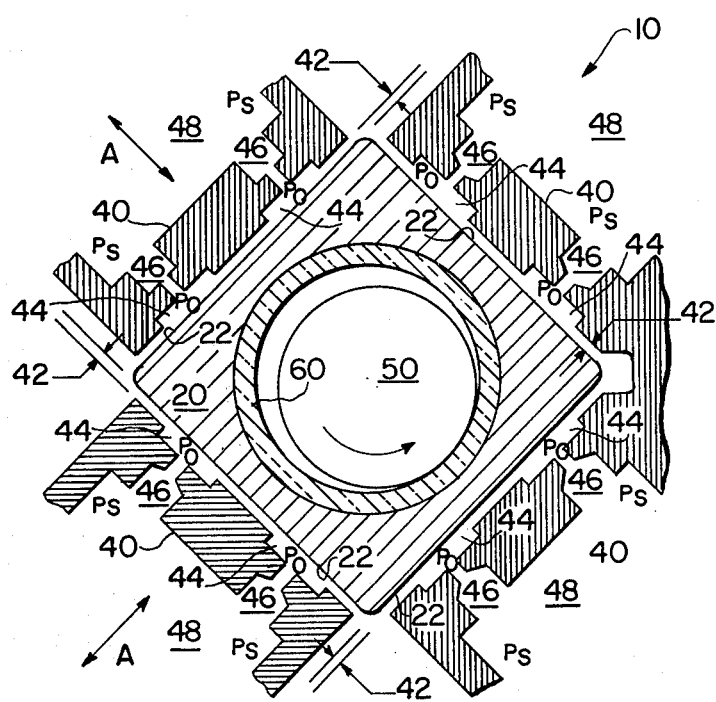
FIG. 2 is a simplified diagrammatic transverse cross-sectional view of a second embodiment of the present invention taken perpendicular to the axis of rotation of the rotating member being supported.

Housing 20 is adapted to receive a rotor 50 and a conventional bearing assembly 60. A journal bearing is depicted, but a roller-element bearing, or any other type of fluid film bearing, may also be used. The outer surface configuration of housing 20, as viewed in transverse cross-section perpencicular to the axis of rotation of rotor 50 is non-circular and preferably polygonal. In the embodiment shown in FIG. 1, the outer surface of housing 20 is shaped such that there are three planar, outwardly facing, working faces 22 symmetrically disposed with respect to the longitudinal axis of housing 20. The outer surface of housing 20 may also be provided with connecting faces 24, as shown. It is to be noted that the number of working faces 22 is not limited to three, nor are connecting faces 24 required. An embodiment of support system 10 having a square housing 20 without connecting faces is illustrated in FIG. 2. Other polygonal geometries may be used as well.

Referring again to FIG. 1, pressure plates 40 are disposed relatively opposite the corresponding working faces 22 and are spaced therefrom such that gaps 42 are defined therebetween when housing 20 is centered with respect to pressure plates 40. At least one pressure plate 40 is movable, as indicated by the doubleheaded arrow A, to adjust the thickness of gaps 42 during operation of support system 10, as will be explained in more detail hereinbelow. An embodiment of support system 10 wherein a plurality of pressure plates 40 are movable is illustrated in FIG. 2.

With further reference to FIG. 1, the gap defining faces of pressure plates 40 are provided with at least two recessed pockets. 44 communicating through orifice 46 with a supply chamber 48 of high pressure fluid, indicated by $P_s$. Orifices 46 act as flow restrictors and provide each pocket 44 with a pressure above the ambient, indicated by $P_o$. A hydrostatic film is thus formed between the working faces 22 and pressure plates 40 which serves to support or suspend housing 20 in spaced relationship between pressure plates 40. In an alternative embodiment, pocket 44 may comprise rows of orifice restrictors (not shown).

Conventional feedback control means (not shown), incorporating sensing elements such as non-contacting displacement probes, force transducers, accelerometers, and the like, may be provided to adjust pressure $P_o$ and the thickness of gaps 42.

In operation, when eccentricities in rotor 50 cause rotor 50 to orbit about the center of bearing 60, housing 20 will tend to follow. The motion of housing 50 is resisted by the forces of the hydrostatic supporting films resulting from the non-circular geometry of housing 50 and the multiple pressure plates 40. Further stabilization of housing 50 is provided by pockets 44. The slight oscillatory motion produced in housing 20 as rotor 50 begins to rotate produces a squeeze film damping force which tends to damp out rotor oscillations. By adjusting the pressure plate(s) 40 which is (are) movable, the thickness of gaps 42, and thus of the hydrostatic supporting films, may be varied. The feature of providing an adjustable film thickness allows the damping coefficient of the supporting film to be controlled. Further, by adjusting film pressure $P_o$, the stiffness of the supporting film may also be varied. As a consequence, the dynamic characteristics of System 10 may be "tuned" to minimize the amplitudes of either synchronous or non-synchronous rotor vibrations without stopping rotation of rotor 50.

It will also be appreciated that the hydrostatic bearing support system of the present invention may be used with appropriate conventional instrumentation to determine the dynamic stiffness and damping properties of particular gas films. To do this, the dynamic displacement of housing 20 relative to each of the pressure plates 40 is measured for predetermined speeds of rotor 50, along with the phase angle between the forces produced by rotor unbalance and the associated displacement of housing 20.

It will be appreciated by those skilled in the art that although the invention has been described relative to exemplary embodiments thereof, modifications and variations can be effected in these embodiments without departing from the scope or spirit of the invention.

I claim:

1. A hydrostatic support system having improved dynamic damping characteristics for bearings used to support a rotating member, said support system comprising a bearing housing in which the bearings are disposed, said bearing housing having a substantially polygonal outer surface configuration as viewed in transverse cross-section perpendicular to the axis of rotation of the rotating member, and the outer surface of said housing forming at least three symmetrically disposed working faces; a pressure plate disposed relatively opposite each of said working faces and spaced therefrom such that a gap is defined between each working face and corresponding pressure plate when said housing is centered with respect to said pressure plates; and means for introducing fluid under pressure into said gaps to form supporting hydrostatic films between said working faces and said pressure plates such that said housing may be suspended between said pressure plates in spaced relationship thereto.

2. The hydrostatic support system of claim 1 wherein at least one of said pressure plates is movable to adjust the thickness of said gaps to thereby vary the damping characteristic of said supporting films.

3. The hydrostatic support system or claim 1 wherein said means for introducing fluid under pressure comprises at least two recessed pockets formed in each of said pressure plates in the surface thereof facing said gap.

4. The hydrostatic support system of claim 1 wherein said means for introducing fluid under pressure includes means for selectively adjusting the pressure of at least one of said supporting films to thereby vary the stiffness characteristic thereof.

5. The hydrostatic support system of claim 4 wherein said recessed pockets comprise rows of orifice restrictors.

* * * * *